Nov. 10, 1925.
G. DE VRIES
STRAIGHTENING AND STRETCHING MACHINE
Filed Aug. 5, 1922    6 Sheets-Sheet 3
1,560,670
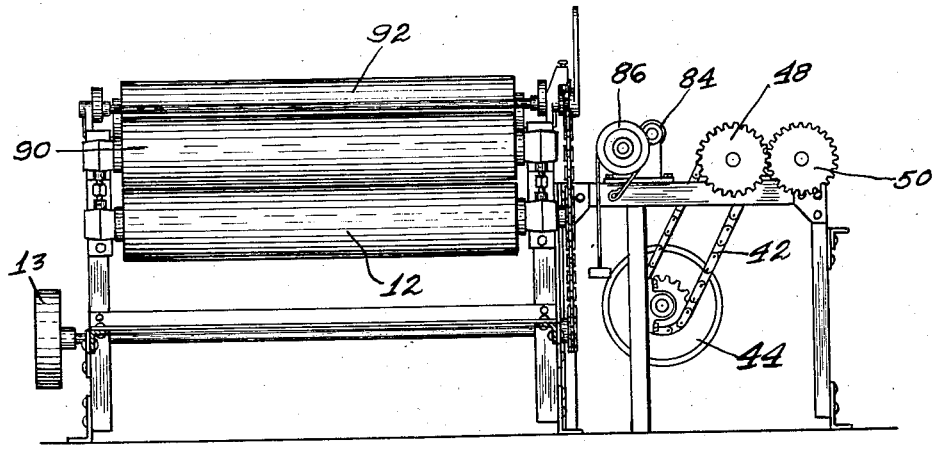
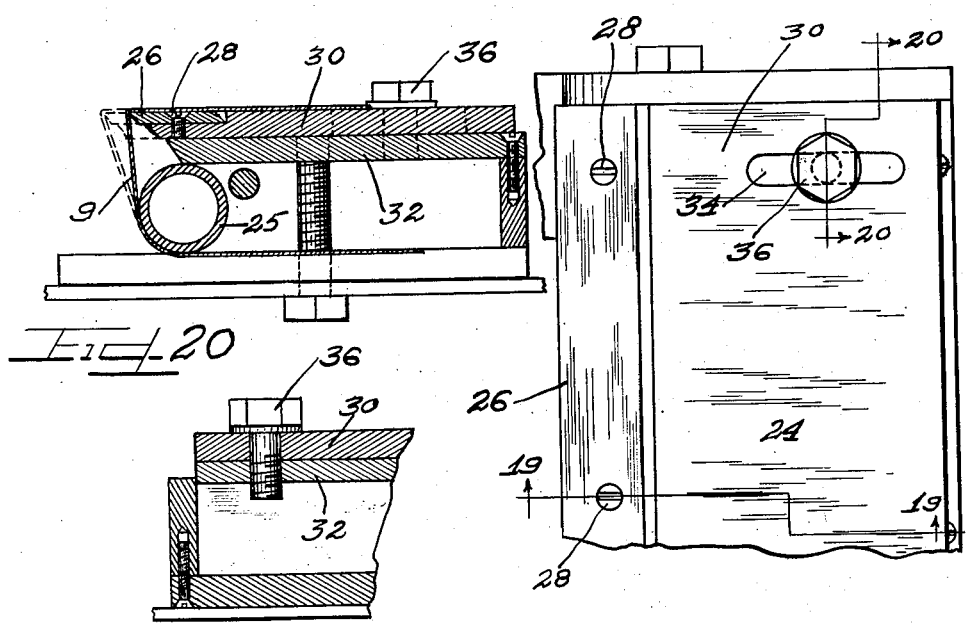
Inventor
GEORGE DE VRIES.
By Mason, Fenwick & Lawrence Attys

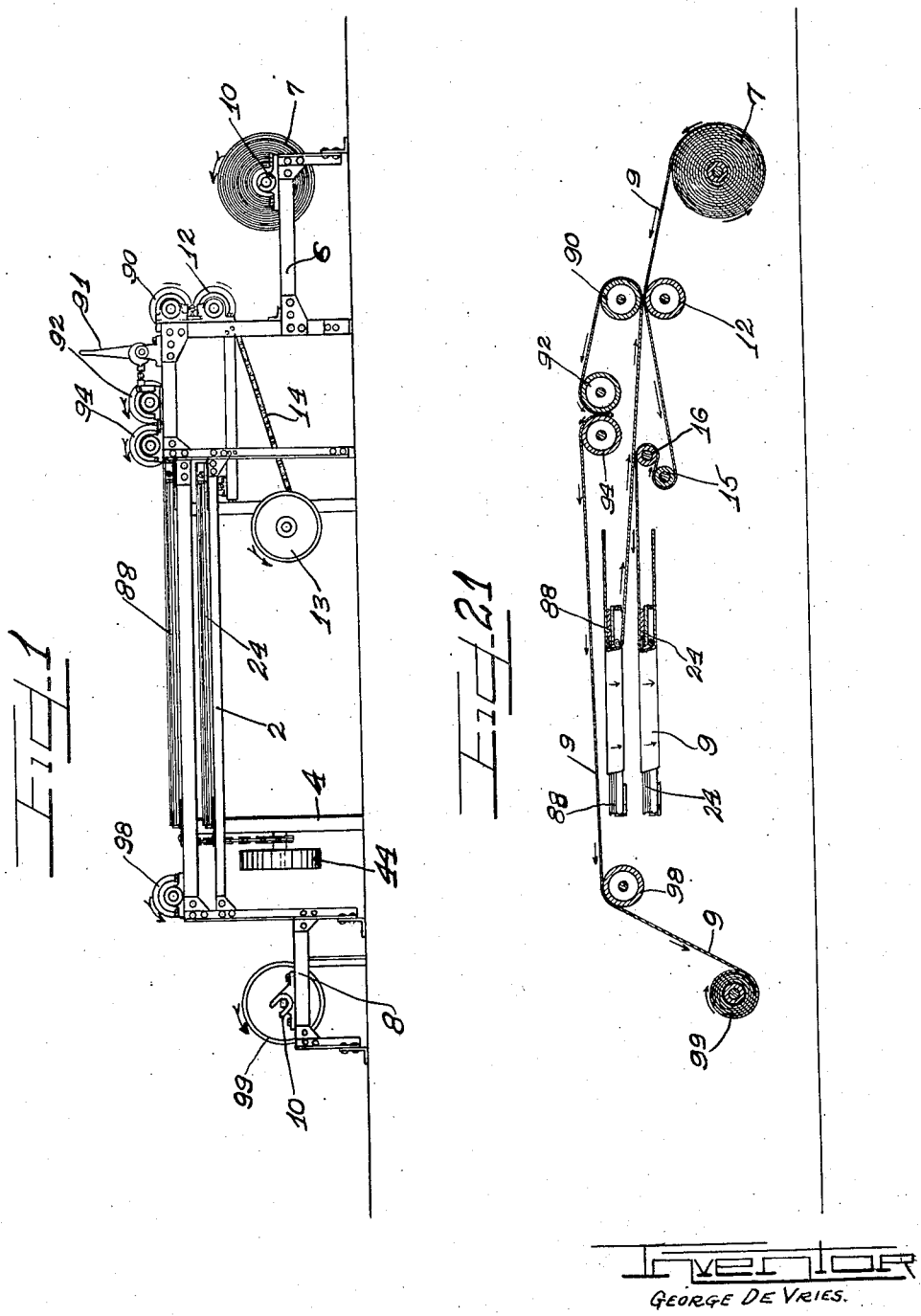

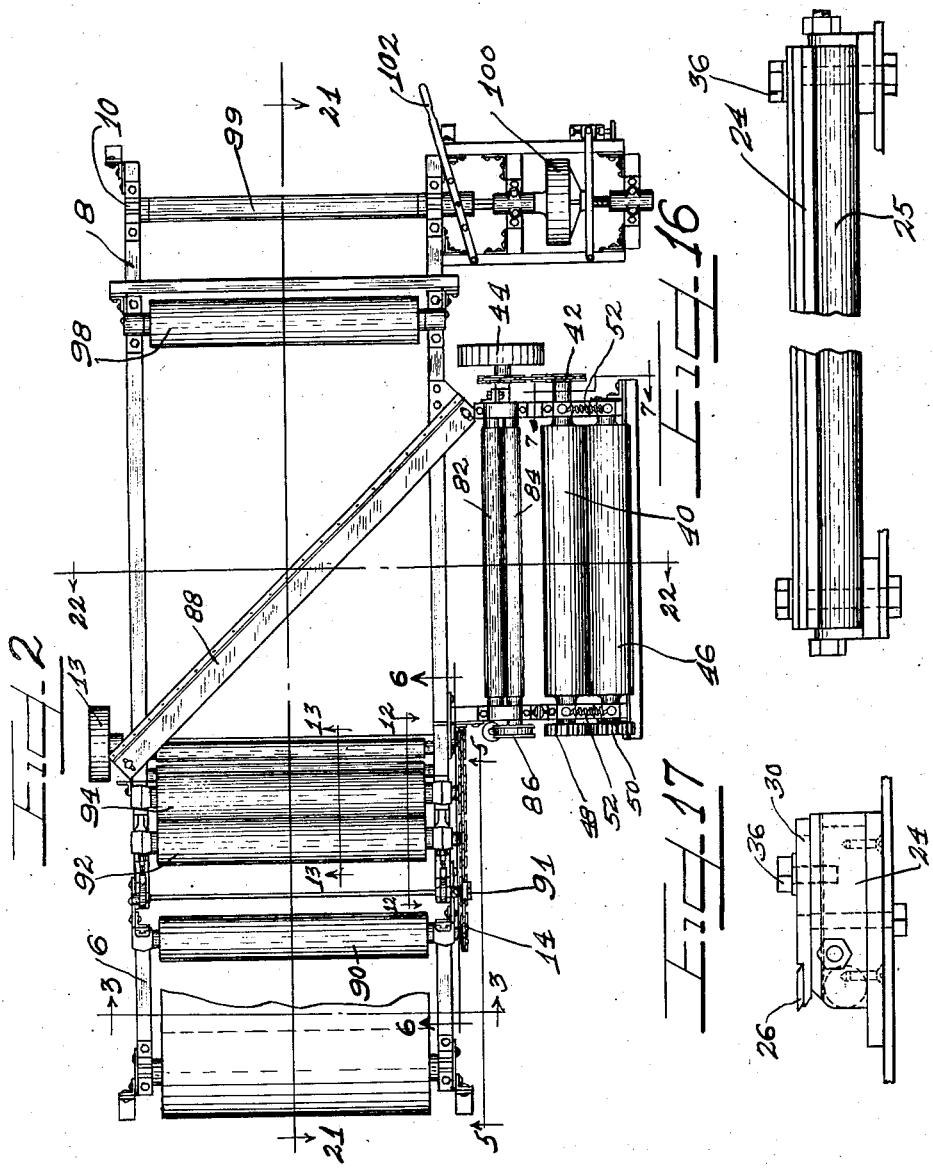

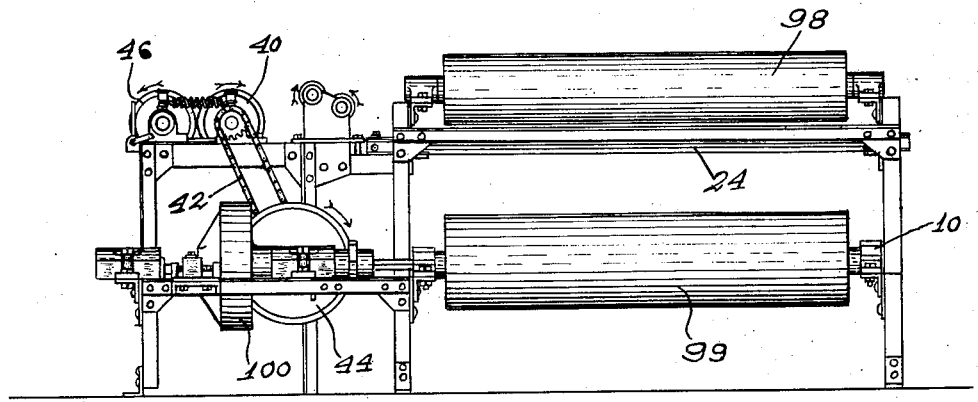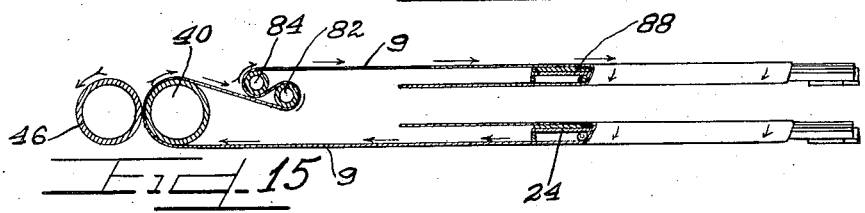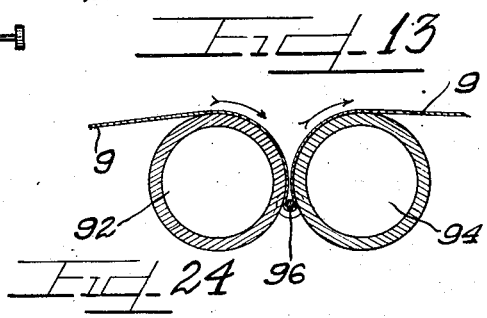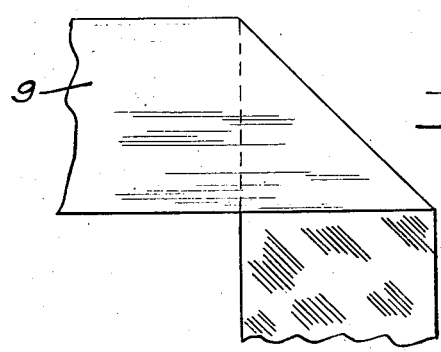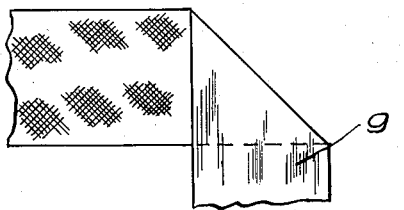

Nov. 10, 1925.  
G. DE VRIES  
1,560,670  
STRAIGHTENING AND STRETCHING MACHINE  
Filed Aug. 5, 1922  6 Sheets-Sheet 5
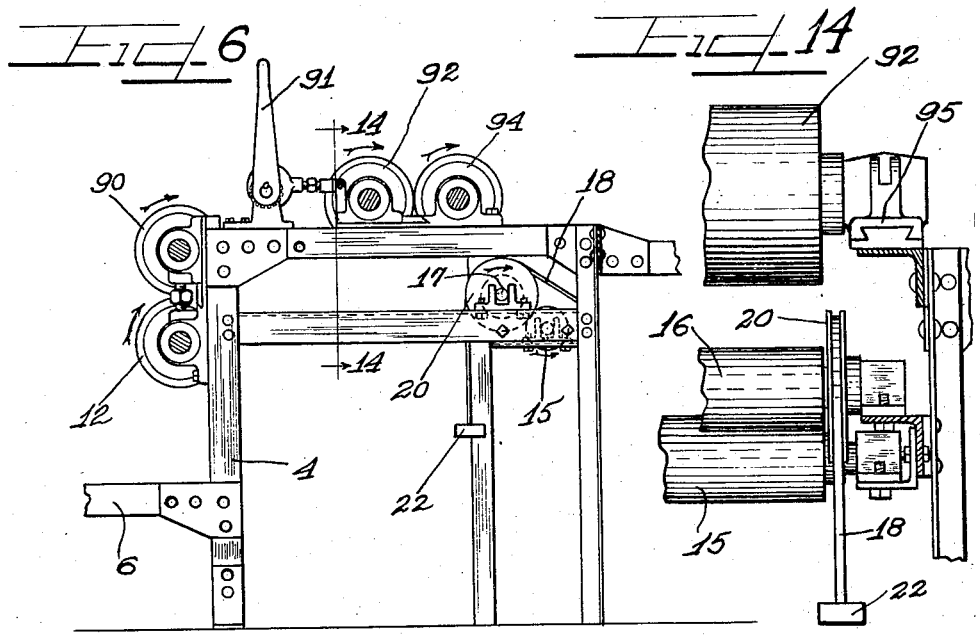
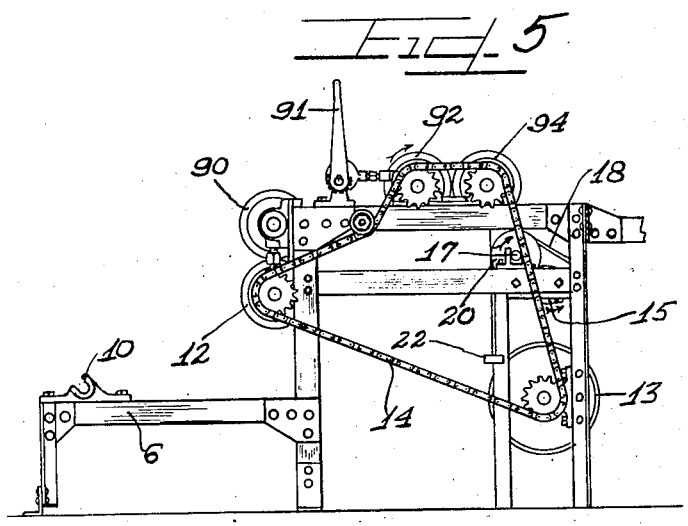
Inventor  
GEORGE DE VRIES.
By Mason, Fenwick & Lawrence Attys

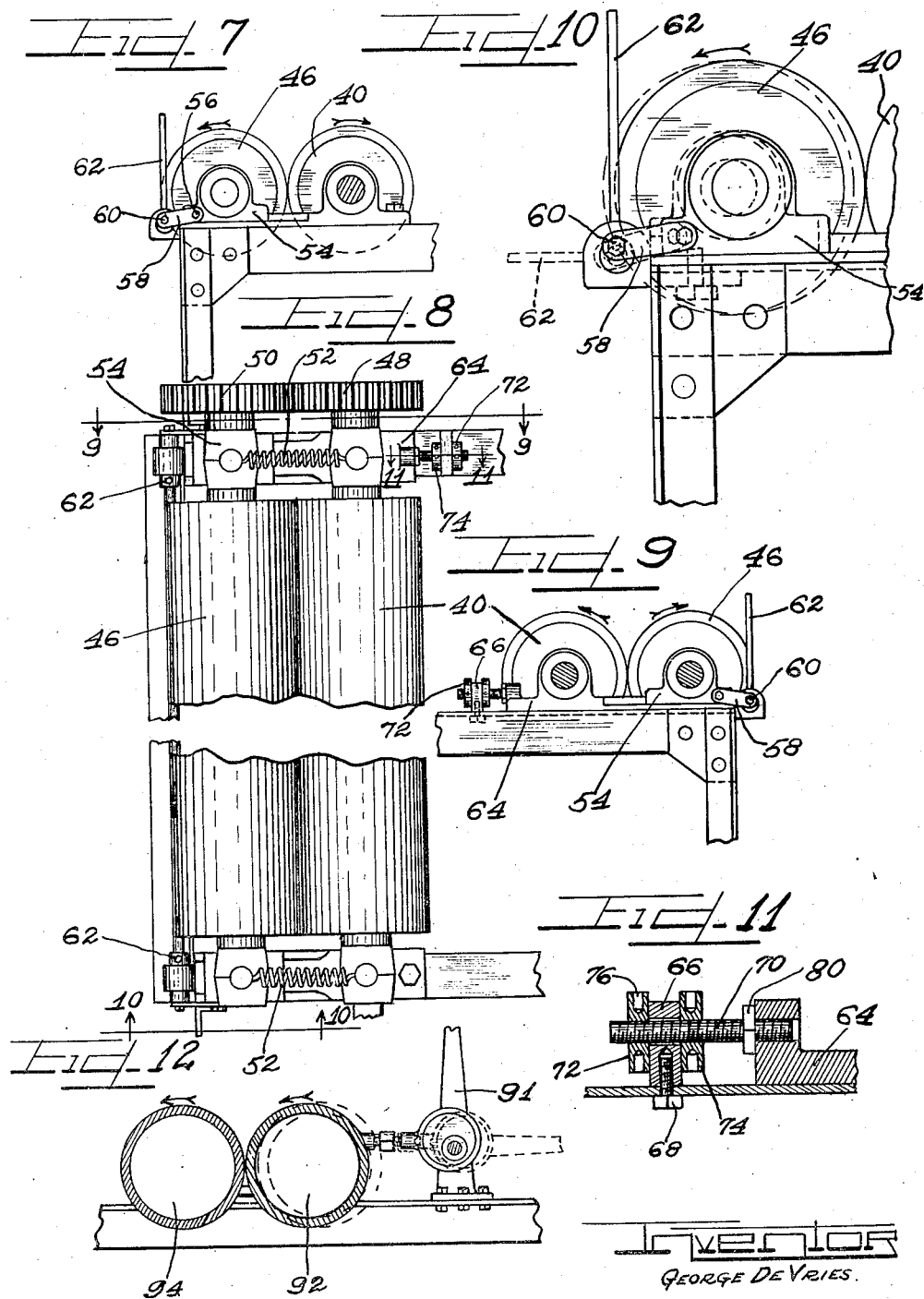

Patented Nov. 10, 1925.

1,560,670

UNITED STATES PATENT OFFICE.

GEORGE DE VRIES, OF CHICAGO, ILLINOIS, ASSIGNOR TO MID-STATES GUMMED PAPER COMPANY, OF CHICAGO, ILLINOIS, A CORPORATION OF ILLINOIS.

STRAIGHTENING AND STRETCHING MACHINE.

Application filed August 5, 1922. Serial No. 579,943.

*To all whom it may concern:*

Be it known that I, GEORGE DE VRIES, a citizen of the United States, residing at Chicago, in the county of Cook and State of Illinois, have invented certain new and useful Improvements in Straightening and Stretching Machines; and I do hereby declare the following to be a full, clear, and exact description of the invention, such as will enable others skilled in the art to which it appertains to make and use the same.

This invention relates to improvements in machines for straightening and stretching gummed paper or the like and has for its principal object the breaking up of a coating of adhesive which has been applied to a strip or sheet of paper so as to prevent the curling of said sheet after the gum or adhesive has dried, and return the paper, as nearly as possible, to its original condition.

Another object of this invention is the provision of a machine which will operate so as to stretch paper or similar material, to which a coating of gum, glue or the like has been applied, that all wrinkles and curls will be removed therefrom and the product, after being put through the machine of this invention, will be straight and even and not liable to wrinkling or curling, which has heretofore constituted a very disagreeable feature of these products.

This tendency of coated material to curl is overcome, in the present invention, by means of a machine through which the coated material or paper is passed and which on its passage through said machine is so acted upon that the glue coating is broken up into myriads of small polygons or many-sided figures the lines of breakage or cleavage extending at approximately right angles to each other forming spaces approximately in the form of parallelograms the glue of which still adheres firmly to the paper.

One of the main objects of this machine is the provision of means for passing glued or gummed paper between tension rolls, thence over breaking bars which break up the glue and then through other tension rolls which are run at a slightly greater speed to straighten or stretch the paper, which operation may be repeated one or more times if desired.

A further important object of the invention is the provision of means in a machine for the stretching and straightening of coated or gummed paper whereby the paper is recalendered on its uncoated surface, so that the product after having been passed through the machine to eliminate any tendency to curling and wrinkling is smooth and unmarred on its uncoated surface.

Other and further important objects of the invention will be apparent from the disclosures in the accompanying drawings and following specification.

The invention, in a preferred form, is illustrated in the drawings and hereinafter more fully described.

In the drawings:

Fig. 1 is a side elevation of the improved machine of this invention;

Fig. 2 is a top plan view of the same;

Fig. 3 is a sectional view of the front end of the machine, taken on the line 3—3 of Fig. 2, looking in the direction indicated by the arrows;

Fig. 4 is an end elevation of the opposite or winding end of the machine;

Fig. 5 is a fragmentary side elevation of the machine as indicated by the lines 5—5 of Fig. 2;

Fig. 6 is a fragmentary sectional side elevation indicated by the broken line 6—6 of Fig. 2;

Fig. 7 is a fragmentary sectional end elevation taken on the line 7—7 of Fig. 2;

Fig. 8 is a top plan view of the construction shown in Fig. 7;

Fig. 9 is a sectional view taken on the line 9—9 of Fig. 8, parts being omitted;

Fig. 10 is an enlarged side elevation, similar to Fig. 7, showing the eccentric and other means to shift one roller to or from its opposing roller;

Fig. 11 is a detail sectional view taken on the line 11—11 of Fig. 8;

Fig. 12 is an enlarged cross section taken on the line 12—12 of Fig. 2, looking in the direction indicated;

Fig. 13 is a sectional view taken on the line 13—13 of Fig. 2, showing in section the calendering roll;

Fig. 14 is an enlarged fragmentary vertical section taken on line 14—14 of Fig. 6;

Fig. 15 is a longitudinal elevation of the calender roller;

Fig. 16 is a broken front view showing one of the breaking bars;

Fig. 17 is an end view of the breaker bar looking to the left;

Fig. 18 is an enlarged top plan view of one end of the breaker bar;

Fig. 19 is a section taken on the line 19—19 of Fig. 18 showing the paper passing over the breaking bar and illustrating the adjustability of the bar in dotted lines;

Fig. 20 is a fragmentary sectional view taken on the line 20—20 of Fig. 18 showing the means for adjusting the position of the breaking bar;

Fig. 21 is a diagrammatic view taken on approximately the line 21—21 of Fig. 2 showing the longitudinal travel of the paper through the machine from the stock roll to the winding roll;

Fig. 22 is a similar diagrammatic view taken at right angles to that shown in Fig. 21 and along the line 22—22 of Fig. 2 showing the direction in which the paper travels after passing over the first breaking bar and returning to the second;

Fig. 23 is a fragmentary top plan view showing the position and condition of the paper after passing over the lower or first breaking bar;

Fig. 24 is a similar view showing the condition of the paper after passing over the upper breaking bar.

As shown in the drawings, the frame of the machine is represented generally by the reference numeral 2 applied to the horizontally extending members thereof which are supported by legs or other vertical elements 4. As shown in Fig. 1, auxiliary frame members to support the stock and the winding roll of the paper or other material are provided and are indicated by the reference numerals 6 and 8, respectively, having semicircular bearings 10 fixed thereon. As the paper 9 leaves the unwinding roll or stock roll 7 it passes over a roller 12 (Fig. 21) which is driven by means of a chain 14 best shown in Figs. 2 and 5. The paper simply passes over the roller 12, being driven forwardly thereby, but this roller has no contact with any other driving or driven element. After passing over the roller 12 the paper is led under and around a smaller roller 15 and thence under and over a similar roller 16, closely adjacent thereto, as best shown in Fig. 21, which rollers 15 and 16 are merely idlers, and provided with a brake means consisting of a cord 18 fixed at one end to the machine, and passing over a pulley 20 having a weight 22 attached thereto, which pulley is mounted on the shaft 17 of the roller 16 so as to retard the free movement of same and provide for the application of a tension on the paper after it has passed over this roller. This brake construction is best shown in Figs. 5 and 6. It is evident that the weight 22 may be so varied as to provide for any proper desired tension on the pulley 20 and consequently on the paper passing over the roller 16. After leaving the roller 16 the paper passes over, around and under the first breaker bar 24, as shown in Fig. 21, and, as best illustrated in Fig. 2, the breaker bars are positioned at an angle to the machine of approximately forty-five degrees whereby in passing over the same the paper is directed into a position at substantially right angles to its original course of travel.

The detail construction of one of the breaker bars is illustrated in Figs. 18, 19 and 20 and, as shown, the bar consists mainly of a blade 26 having two sharpened edges thereon which, as best illustrated in Fig. 19, are provided on diagonally opposite corners thereof so that the same may be reversed when one of the edges has become dulled with use. The blade 26 is mounted by means of screws 28 upon an adjustable plate 30 which is positioned upon a diagonally extending portion 32 of the frame of the machine 2. Beneath and parallel with the front edge of frame member 32 is a guide roller 25. The adjustment of the plate 30 is accomplished by means of slots 34 in the plate 30 and which slots have passing therethrough cap screws or the like 36 threaded into the plate 32. One of the slots 34, together with a corresponding cap screw 36, is provided at each end of the plate 32 and it will be obvious that by means of said construction the relation of the plate 30, together with the blade 26, may be adjusted relative to the frame member 32 and roller 25. As illustrated by the dotted lines in Fig. 19 the position of the breaker bar edge can be varied slightly so as to provide for a different bending angle of the paper when it passes over the same. This is necessary on acount of the various thicknesses of paper used and which in practice it has been found requires a different angle of breakage in order to produce the desired result. When a heavy paper is used the breaker bar 24—26 is adjusted outwardly until approximately the position is reached as shown by the dotted lines in Fig. 19.

The paper 9, having passed over the lower breaking bar 24 and its direction of travel having been changed to approximately right angles to its original path, it will travel outwardly into the lateral extension of the machine which is best illustrated in Fig. 2 and, as shown in Fig. 22, then passes over a feed roller 40 turning in the direction as indicated by the arrows and which is driven by means of a chain, belt or the like as shown at 42 in Figs. 2 and 3, from any suitable source of power as shown by the pulley 44. Frictionally contacting with the roller 40 is a similar roller 46 driven at the same speed as the roller 40 by means of gears 48 and 50 attached respectively to the ends of the shafts supporting the rollers 40 and 46 which gears are normally maintained in mesh with each other by means of two springs 52, one at each end of the bearings for the rollers. These bearings are designated by the reference numerals 54 and 78 and are slidably mounted on the frame of the machine. A quick separation of the rollers 40 and 46 is accomplished by sliding the bearing 54 outwardly against the tension of the springs 52 by means of the handle 62 pivotally mounted on the machine, and which has eccentrically connected thereto a link 58 by means of a pivot pin 60. The other end of the link 58 is pivoted to the forward portion of the slidable bearing 54. It will be obvious that a downward pull on the lever 62 will act to separate the roll 46 from the roll 40, as best shown by the dotted lines in Fig. 10. The adjustment of the other bearing 64 is accomplished by means of the construction as illustrated in Figs. 9 and 11. This consists merely of a fixed upstanding member 66 fastened to the machine by means of a cap screw 68 or the like and which has slidably mounted therethrough a screw-threaded bar 70. Screwed onto this bar 70 on opposite sides of the fixed member 66 are adjusting nuts 72 and 74 having openings 76 therein into which a pin or the like may be inserted for the purpose of turning the same. The end of the bar 70 is fixed to the bearing 64 by means of screw threads and a lock nut 80 or the like.

After leaving the rollers 40 and 46 the paper passes under and partially around the rollers 82 and 84 as shown in Fig. 22. The roller 84 is provided with a braking device similar to that which has been heretofore described and which is now simply designated by the numeral 86 (Figs. 2 and 3).

In this way the tension of the paper may be accurately adjusted at any desired point in the machine. From the rollers 82—84 the paper 9 passes back into the machine proper and over the top breaker bar 86, as shown in Fig. 22, which, being mounted at an angle of forty-five degrees to the frame of the machine, tends to redirect the paper into a path parallel to the path of its original travel into the machine. The glue, when the paper is carried over the first or lower breaking bar has been cracked into a series of lines extending in a direction diagonally of the paper and when the paper is passed over the upper breaking bar the direction of break in the glue is at substantially right angles to the first line of break and the glue or other coating is thereby broken up into a number of small squares or rectangles which result is illustrated in Figs. 23 and 24. As shown in Fig. 21, the paper passes over the top breaker bar 88 and thence under the same from whence it is delivered to a roller 90 directly over the initial roller 12 but having no connection or contact therewith.

As best shown in Fig. 5 the roller 90 is not driven and is simply an idler over which the paper passes to reverse its direction, whence it is delivered to the calendering rolls 92 and 94 which, as shown in Fig. 5, are driven by the chain 14 and in the same direction but not quite in contact with each other, thereby providing space for the paper to run down on one side of the roller 92 and up on the other side of the roller 94 and permit of the inserting of a calendering roller 96 therebetween. This construction is best illustrated in Fig. 13 and the calendering roller itself shown in plan view in Fig. 15. The calender rolls 92 and 94 are adapted to be separated by means of an operation of a lever 91 constructed similarly to lever 62 and illustrated in Fig. 12. The slidable dovetail construction of the bearing supports for the rolls 92 and 94 is best shown at 95 in Fig. 14. The friction created by the two rolls 92 and 94 and the floating calender roll 96, as shown in Fig. 13, recalenders the surface of the paper and returns the natural glazed appearance to the same which was present before the glue was applied thereto. It has been found by experience that when glue is applied to paper it has a natural tendency to shrink the paper which causes unevenness or wrinkling of the same and also removes the gloss or calender finish from the other or uncoated side of the paper leaving it in a rather dull and fuzzy condition. The calender finish of the paper is also affected by its passing over the breaking bars 24 and 88 which finish is effectively renewed by means of the calendering means just described. After leaving the calendering rolls and the paper passes over an idler roller 98 and from thence to a suitable winding roll 99 positioned at the rear end of the machine, and which constitutes the receiver for the finished stock. This calendering also finally straightens the paper by eliminating any reverse curl which might be present therein on account of its having been drawn over the broken bars.

The winding roll 99 is driven by a suitable source of power, as illustrated by a pulley 100 in Figs. 2 and 4, having a clutch or the like applied thereto and operated by means of a lever or handle 102.

The operation is as follows: As the paper leaves the stock roll or unwinding roll 7 it passes over the roller 12, then under the roller 15 on one side thereof and over the same to the roller 16, which last named roller has braking means mounted thereon whereby the proper tension on the paper may be applied. After rounding the roller 16 the paper passes over the lower breaking bar 24, thence sideways out of the machine to the feed rollers 40 and 46, the speed of which is also adjusted that a sufficient pull or tension is applied to the paper to insure of a positive breaking of the surface of the glue which has been applied thereto and also removes, at least preliminarily, the wrinkles or curls which are present in the paper on account of the glue. After leaving the driving or pulling rollers 40—46 the paper passes over and under the rollers 82 and 84, respectively, the last named of which has another braking device applied thereto, whereby the tension of the paper may be again adjusted for its passage over the next breaking bar. From thence the paper passes over and down under the second breaking bar 88 which, as has been explained, has a tendency to break the surface of the glue into cracks at right angles to the original cracks made therein by its first passage over the lower breaking bar 24. From the upper breaking bar the paper passes, as shown in Fig. 21, under and around the roller 90 and from thence to the calender rolls 92—94—96, where it is resurfaced, thence over the idle roller 98 and to the winding roll 99 which is driven at variable speeds by the power means 100.

When the paper reaches the idle roller 98 the glue on the same has been broken into myriads of small squares which still adhere to the paper; the paper has been straightened out and all the stretch taken out of the same so that there are no wrinkles present and when this gummed paper is cut into sheets it will lay perfectly flat. The purpose of the brakes which have been described is to reduce the speed of the paper at desired points and maintain a proper tension on the paper to prevent any tearing thereof, and the braking means have been so located that the tension of the paper may be accurately adjusted at any point in the machine. The three drives as shown in the drawings indicated by the reference numerals 13, 44 and 100 are all adjustable for different speeds, and are thrown into action successively as follows: first 13, then 44 and then 100. These drives may be separate electric means, if desired. In a long stretch of paper considerable slack takes place and in order to maintain the same tension throughout, the speed of the various rollers and drives are separately controlled by the three power-operated pulleys or other motive mechanisms 13, 44 and 100, and also by the braking means 20 and 86. The operator, in feeding the paper to the machine, starts the paper from the stock roll 7, passes it over roll 12; then power is applied to pulley 13 which in turn rotates the roll 12 and aids the operator in feeding the paper over the first breaking bar 24; then power is applied to the pulley 44 which in turn drives the rollers 40 and 46 which further aids the operator to feed the paper over the upper breaking bar 88. The paper is then passed under the roll 90, over the calendering rolls 92 and 94, then over the roll 98 to the winding roll. A proper attachment of the paper is made to the winding roll and power applied to the pulley 100 by means of the clutch lever 102, after which the machine is in full operation.

In many cases the paper is wrinkled or the like due to improper feeding so that until such wrinkles have been taken out the calender roll is omitted. During all this time the roll 92, as shown in Fig. 12 by the dotted lines, has been pulled away from frictional engagement with the roll 94 so that it is an easy matter to place the calender roll 96 over the paper and draw the paper down between the two rolls 92 and 94 after which the rell 92 is forced toward the roll 94 by means of the lever 91 so as to create friction between the rollers 92, 94 and the calender roll 96 as shown in Fig. 13. The friction created by the two rolls 92 and 94 and the calender roll 96 recalenders the surface of the paper and returns the natural glaze to the same which was present before the glue was applied thereto.

After the feeding of the paper has been accomplished through the entire machine the speed of the single power shaft which controls the three variable driving mechanisms 13, 44 and 100 is gradually increased until a maximum speed at which the paper can be fed is attained.

I am aware that many changes may be made and numerous details of construction varied throughout a wide range without departing from the principles of this invention and I therefore do not purpose limiting the patent granted hereon otherwise than as necessitated by the prior art.

I claim as my invention:

1. In a straightening and stretching machine for coated material, the combination of a breaker bar and a guide roller with means for varying the relation of said bar and roller whereby the angle of the bend produced in material drawn over said bar and roller may be varied.

2. In a straightening and stretching machine for coated material, a breaker bar having a sharpened edge, a roller disposed parallel with said sharpened edge and means for adjusting the breaker bar with respect to the roller.

3. In a straightening and stretching machine for coated material, the combination of a plurality of breaking bars over which the material is adapted to be drawn and adjustable tension means adapted to engage the material intermediate said breaker bars.

4. In a straightening and stretching machine for coated material, a plurality of variable power drives and a plurality of coating breaker bars over which the material is drawn by said power driving means, said breaker bars including reversible blades having edges over which the coating is passed.

5. In a straightening and stretching machine for coated material, a plurality of variable power drives, a plurality of coating breaker bars over which the material is drawn by said power driving means, and means for adjusting the angle of passage of said material over the breaker bars.

6. In a straightening and stretching machine for coated material, a plurality of variable power drives and a plurality of coating breaker bars over which the material is drawn by said power driving means, said breaker bars including reversible blades having edges over which the coating is passed and means for adjusting the angle of passage of said material over the blades.

7. In a straightening and stretching machine for coated material, a plurality of variable power drives, a plurality of coating breaker bars over which the material is drawn by said power driving means, and means for adjusting the angle of passage of said material over the breaker bars, said means including a fixed plate mounted on the machine, a blade retaining means slidably mounted on said fixed plate, slots in said blade retaining means and bolts passed through said slots into the fixed plate.

8. A machine for straightening coated material comprising a supporting reel for the material, an edged breaker over which the material is drawn, said breaker being positioned intermediate a pulling means for the material, a retarding device acting on said material, and a second breaker bar beyond the first breaker bar, said second breaker bar being likewise positioned between a pulling means and a retarding device.

9. In a straightening and stretching machine, a pair of feed rollers, both of said rollers being movably mounted on said machine, means for adjusting the position of one roller with respect to the machine, and means for adjusting the position of the second roller with respect to the first roller, said first named adjusting means comprising an upstanding lug fixed to the machine, a screw-threaded bar passing freely therethrough, one end of said bar attached to the roller support, and means for adjusting the position of the other end of said bar with respect to the upstanding lug.

10. In a straightening and stretching machine, a pair of feed rollers, both of said rollers being movably mounted on said machine, means for adjusting the position of one roller with respect to the machine, and means for adjusting the position of the second roller with respect to the first roller, said last named adjusting means including a link pivoted at one end to the support for the second roller, and a lever pivoted on the frame of the machine, the other end of said link being eccentrically mounted on said lever.

11. In a straightening and stretching machine for coated material, a series of pulling means, breaker bars over which said material is passed, retarding means whereby the proper tension is maintained on said material, and means for recalendering the surface of the material passed through said machine.

12. In a straightening and stretching machine for coated material, a plurality of variable power drives, a plurality of coating breaker bars over which the material is drawn by said power driving means, and means for recalendering the surface of the material passed through said machine.

13. In a straightening and stretching machine, means for calendering and straightening the material passed through said machine, said means including a pair of relatively fixed rolls, and a free calendering roll adapted to cooperate therewith, said calendering roll being supported by the material between the contacting relatively fixed rollers.

In testimony whereof I affix my signature.

GEORGE DE VRIES.